(12) United States Patent
Kwack et al.

(10) Patent No.: US 11,811,090 B1
(45) Date of Patent: Nov. 7, 2023

(54) SEPARATOR, METHOD OF MANUFACTURING SEPARATOR, AND ELECTROCHEMICAL DEVICE INCLUDING SEPARATOR

(71) Applicants: SK INNOVATION CO., LTD., Seoul (KR); SK IE TECHNOLOGY CO., LTD., Seoul (KR)

(72) Inventors: Won Sub Kwack, Daejeon (KR); Tae Wook Kwon, Daejeon (KR); Heung Taek Bae, Daejeon (KR); Chang Hee Lee, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/331,449

(22) Filed: Jun. 8, 2023

(30) Foreign Application Priority Data

Jun. 9, 2022 (KR) .................... 10-2022-0070370

(51) Int. Cl.
| | | |
|---|---|---|
| *H01M 50/403* | (2021.01) | |
| *H01M 50/446* | (2021.01) | |
| *H01M 50/449* | (2021.01) | |
| *H01M 10/0525* | (2010.01) | |

(52) U.S. Cl.
CPC ..... *H01M 50/446* (2021.01); *H01M 10/0525* (2013.01); *H01M 50/403* (2021.01); *H01M 50/449* (2021.01)

(58) Field of Classification Search
CPC ............ H01M 50/446; H01M 50/403; H01M 50/449; H01M 10/0525
See application file for complete search history.

(56) References Cited

U.S. PATENT DOCUMENTS

| | | | | |
|---|---|---|---|---|
| 2015/0255768 A1* | 9/2015 | Konishi | ............ | D04H 1/43835 429/144 |
| 2022/0069419 A1* | 3/2022 | Han | .................... | H01M 50/449 |

FOREIGN PATENT DOCUMENTS

| KR | 20080017114 A | 2/2008 |
|---|---|---|
| KR | 20140011136 A | 1/2014 |
| KR | 20190140854 A | 12/2019 |
| KR | 20200144717 A | 12/2020 |

* cited by examiner

*Primary Examiner* — James Lee
(74) *Attorney, Agent, or Firm* — IP & T GROUP LLP

(57) ABSTRACT

The present invention relates to a separator, a method of manufacturing the separator, and an electrochemical device including the separator. An embodiment of the present invention may provide a separator including: a porous substrate; an inorganic particle layer provided on at least one surface of the porous substrate; and a heat fusion layer provided on at least one surface of the inorganic particle layer, wherein a surface gloss value at 60° C. of a surface of the heat fusion layer is 10 GU or more.

7 Claims, No Drawings

SEPARATOR, METHOD OF MANUFACTURING SEPARATOR, AND ELECTROCHEMICAL DEVICE INCLUDING SEPARATOR

CROSS-REFERENCE TO RELATED APPLICATIONS

This application claims priority under 35 U.S.C. § 119 to Korean Patent Application No. 10-2022-0070370, filed on Jun. 9, 2022, the disclosure of which is incorporated herein by reference in its entirety.

TECHNICAL FIELD

Embodiments of the following disclosure relate to a separator, a method of manufacturing the separator, and an electrochemical device including the separator, and in particular, to a separator that may secure significantly improved high heat resistance and has excellent adhesiveness with an electrode, a method of manufacturing the separator, and an electrochemical device including the separator.

BACKGROUND

Separators applied to various electrochemical devices may cause an internal short circuit due to shrinkage at a high temperature or a lack of an adhesive strength to an electrode, and there is a risk of fire due to the internal short circuit. Therefore, the thermal stability and the adhesive strength to the electrode of the separator should be necessarily improved for a user's safety. In order to secure the thermal stability of the separator, an organic-inorganic composite porous separator in a form in which an inorganic particle layer is stacked on a surface of a porous substrate has been developed. However, the organic-inorganic composite porous separator improves the thermal stability such as a heat shrinkage rate to some degree, but the products currently on the market still lack thermal stability and also lack an adhesive strength to an electrode.

When the organic-inorganic composite porous separator does not have a sufficient adhesive strength to an electrode, a battery assembled by stacking the separator and the electrode may cause a lifting phenomenon in which a space where the electrode and the separator are irregularly spaced is formed according to repeated charging and discharging, and accordingly, a short circuit between the electrodes occurs during an operation of the battery, resulting in a concern of stability such as fire.

Therefore, there is a need for a technology that may further improve the thermal stability of the separator and also may sufficiently maintain the adhesiveness between the separator and the electrode so that the lifting phenomenon does not occur between the electrode and the separator.

RELATED ART DOCUMENT

Patent Document (Patent Document 1) Korean Patent Laid-Open Publication No. 10-2014-00011136 (Jan. 28, 2014)

SUMMARY

Embodiments of the present invention are directed to providing a separator having significantly improved heat resistance and excellent adhesiveness with an electrode, a method of manufacturing the separator, and an electrochemical device with excellent electrical characteristics including the separator.

In one general aspect, a separator includes: a porous substrate; an inorganic particle layer provided on at least one surface of the porous substrate; and a heat fusion layer provided on at least one surface of the inorganic particle layer, wherein a surface gloss value at 60° C. of a surface of the heat fusion layer is 10 GU or more.

In addition, in an embodiment, the surface gloss value at 60° C. of the surface of the heat fusion layer may be 20 GU or more.

In addition, according to an embodiment, when specimens each having a thickness of 5 to 50 μm, a width of 5 mm, and a length of 10 mm in each of a machine direction (MD) and a transverse direction (TD) serving as length directions are prepared from the separator, and the specimen is mounted on a chamber of a thermomechanical analyzer (TMA) by hooking both ends of the specimen to a metal jig and pulled downward with a force of 0.008 N while heating at 5° C. per minute, the specimen may have heat resistance in which the specimen is broken at a temperature of 180° C. or higher in both MD and TD.

In addition, in an embodiment, a heat shrinkage rate in each of MD and TD may be 3% or less when measured after the separator is allowed to stand at 150° C. for 60 minutes.

In addition, according to an embodiment, the separator may have an adhesive strength of more than 5 gf when measured by stacking the separator on a carbon sheet having a thickness of 200 μm so that the heat fusion layer of the separator faces the carbon sheet, compressing and fusing the carbon sheet and the separator at 80° C. and 1 MPa for 30 seconds with a heat press machine, and then peeling the separator at 180°.

In addition, according to an embodiment, the separator may have an amount of change in air permeability ΔG represented by the following Formula (1) of 60 sec/100 cc or less:

$$\Delta G = G_1 - G_2 \quad (1)$$

wherein $G_1$ is a Gurley permeability of the separator, $G_2$ is a Gurley permeability of the porous substrate, and the Gurley permeability is measured according to ASTM D 726.

In addition, in an embodiment, the heat fusion layer may include an acrylic particulate binder having a glass transition temperature Tg of 30° C. to 70° C.

In addition, in an embodiment, the inorganic particle layer may include inorganic particles and a hydrolytic condensate of a silane compound.

In addition, in an embodiment, the hydrolytic condensate of the silane compound may be a hydrolytic condensate obtained in a weakly acidic atmosphere.

In addition, in an embodiment, the silane compound may be a compound represented by the following Chemical Formula 1:

  [Chemical Formula 1]

wherein A is hydrogen, a polar functional group, or a C1-C10 alkyl group having a polar functional group, R is independently hydrogen or a C1-C5 alkyl group, a is 0 to 2, b is 2 to 4, and a+b is 4.

In addition, in an embodiment, the polar functional group may include one or two or more of an amino group, an epoxy group, a carboxyl group, a hydroxyl group, an amide group, a thiol group, a ketone group, an ester group, and an aldehyde group.

In addition, in an embodiment, the porous substrate may have a surface including a polar functional group.

In another general aspect, a method of manufacturing a separator includes: (a) adding inorganic particles and an acid component to an aqueous solution of a silane compound represented by the following Chemical Formula 1 and performing stirring and bubbling to prepare a slurry; (b) applying the prepared slurry on at least one surface of a porous substrate to form an inorganic particle layer; and (c) forming a heat fusion layer on at least one surface of the formed inorganic particle layer, wherein a surface gloss value at 60° C. of a surface of the heat fusion layer is 10 GU or more:

[Chemical Formula 1]

wherein A is hydrogen, a polar functional group, or a C1-C10 alkyl group having a polar functional group, R is independently hydrogen or a C1-C5 alkyl group, a is 0 to 2, b is 2 to 4, and a+b is 4.

In addition, in an embodiment, the process (b) may include applying the prepared slurry on the porous substrate and then allowing the slurry to stand at room temperature for 5 minutes or longer.

In addition, in an embodiment, the heat fusion layer may include an acrylic particulate binder having a Tg of 30 to 70° C.

In addition, in an embodiment, the polar functional group of the silane compound may include one or two or more selected from an amino group, an epoxy group, a carboxyl group, a hydroxyl group, an amide group, a thiol group, a ketone group, an ester group, and an aldehyde group.

In addition, in an embodiment, the process (a) of preparing the slurry may be performed in a weakly acidic atmosphere of more than pH 4 and pH 7 or less.

In addition, in an embodiment, the acid component may be carbon dioxide, or an organic acid including one or two selected from acetic acid and lactic acid.

In an embodiment, the inorganic particles and the silane compound of Chemical Formula 1 may be included in the slurry in the process (a) at a weight ratio of 70 to 99.9:30 to 0.1.

In still another general aspect, an electrochemical device includes the separator according to embodiments of the present invention as described above.

Other features and aspects will be apparent from the following detailed description, the drawings, and the claims.

DETAILED DESCRIPTION OF EMBODIMENTS

Hereinafter, the present invention will be described in more detail with reference to specific embodiments including the accompanying drawings. However, each of the following embodiments is merely an example, and the present invention is not limited thereto and may be implemented in various forms.

In addition, unless otherwise defined, all the technical terms and scientific terms have the same meanings as commonly understood by those skilled in the art to which the present invention pertains. The terms used in the description of the present invention are merely used to effectively describe specific embodiments, but are not intended to limit the present invention.

In addition, unless the context clearly indicates otherwise, singular forms used in the specification and the scope of the appended claims are intended to include plural forms.

In addition, unless explicitly described to the contrary, "comprising" any components will be understood to imply further inclusion of other components rather than the exclusion of any other components.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman Coulter Inc.

According to an embodiment of the present invention, a separator may include: a porous substrate; an inorganic particle layer provided on at least one surface of the porous substrate; and a heat fusion layer provided on at least one surface of the inorganic particle layer, wherein a surface gloss value at 60° C. of a surface of the heat fusion layer is 10 GU or more.

When the separator satisfies the conditions of the embodiments described above, the separator may have excellent thermal stability so that when specimens each having a thickness of 5 to 50 μm, a width of 5 mm, and a length of 10 mm in each of a machine direction (MD) and a transverse direction (TD) serving as length directions are prepared from the separator, and the specimen is mounted on a chamber of a thermomechanical analyzer (TMA) (model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, or 210° C. or higher in both MD and TD.

In an embodiment, a heat shrinkage rate in each of MD and TD may be 3% or less or 2.5% or less when measured after the separator is allowed to stand at 150° C. for 60 minutes.

At the same time, the separator of an embodiment may have excellent adhesive strength to an electrode of more than 5 gf or 10 gf or more when measured by stacking the separator on a carbon sheet (TOYO TANSO KOREA CO., LTD., PF-20HP) having a thickness of 200 μm, which is used instead of an electrode, so that the heat fusion layer of the separator faces the carbon sheet, compressing and fusing the carbon sheet and the separator at 80° C. and 1 MPa for 30 seconds with a heat press machine, and then peeling the separator at 180° using a universal testing machine (UTM) available from Instron Corporation.

In addition, in an embodiment, the separator may have an amount of change in air permeability ΔG represented by the following Formula (1) of 60 sec/100 cc or less.

$$\Delta G = G_1 - G_2 \qquad (1)$$

In Formula (1), $G_1$ is a Gurley permeability of the separator, $G_2$ is a Gurley permeability of the porous substrate, and the Gurley permeability is measured according to ASTM D 726 and is derived by recording a time required for 100 cc of air to pass through an area of 1 square inch of the separator in seconds using a densometer available from Toyo Seiki Seisaku-sho, Ltd. Even though the separator according to an embodiment includes the inorganic particle layer and the heat fusion layer, the separator may have improved air permeability so that an amount of change in air permeability is 60 sec/100 cc or less compared to a porous substrate without an inorganic particle layer and a heat fusion layer.

The separator satisfying the above physical properties may be a separator that basically satisfies the gloss, and at the same time, satisfies heat resistance characteristics. A method of satisfying physical properties such as the gloss value is not particularly limited as long as the above physical properties are satisfied. As a non-limiting example of a method of imparting the above physical properties, it is possible to adopt various methods such as the size and particle size distribution of the inorganic particles, the type of the binder, the fluidity of the binder, the content of the polar group, the surface characteristics of the porous substrate, the type and size of organic polymer particles forming the heat fusion layer, and a method of applying a slurry including inorganic particles constituting an inorganic particle layer and a binder on a porous substrate, allowing the slurry to stand at room temperature for a predetermined time, and giving a time to rearrange the inorganic particles and the binder in the slurry and to induce the inorganic particle layer to be filled with the inorganic particles at a high density, but the methods for imparting the above physical properties are not limited thereto.

As the method of imparting the above physical properties, according to an embodiment, a hydrolytic condensate of a silane compound having a significantly low molecular weight prepared under a specific condition in which a silanol or alkoxysilane-based compound is hydrolyzed and is condensation-suppressed is used as a binder, such that the thermal stability of the separator may be significantly improved. That is, according to an embodiment, the shrinkage rate at a high temperature may be significantly reduced, and the thermal stability may be significantly improved. At the same time, when the surface gloss value at 60° C. of the surface of the heat fusion layer satisfies a specific surface gloss and the above method is also satisfied, both significantly improved thermal stability and an excellent adhesive force to an electrode may be better provided to the separator.

Moreover, it is considered that the hydrolytic condensate of the silane compound as a binder has fluidity higher than a high molecular weight binder according to the related art due to its significantly low molecular weight, such that the inorganic particle layer is better filled with the inorganic particles at a high density or defects between the inorganic particles are eliminated or minimized, and a thickness uniformity of the inorganic particle layer is well imparted. Furthermore, from this reasoning the thickness of the inorganic particle layer is significantly uniform, the heat fusion layer formed on the inorganic particle layer filled with the inorganic particles at a high density has increased smoothness and increased surface gloss, and has an improved adhesive strength compared to a common heat fusion layer having the same thickness. Therefore, the thermal stability, mechanical properties, and electrical characteristics of the separator may be improved. That is, the surface gloss value of the heat fusion layer may be complexly influenced by the methods described above, the thickness of the heat fusion layer, the surface state, the thickness of the inorganic particle layer, the diameter of the inorganic particle, and the like.

However, when the heat fusion layer is formed on the inorganic particle layer so that the surface gloss value at 60° C. of the surface satisfies 10 GU or more, it is understood that it is possible to secure an excellent adhesive strength to an electrode while exhibiting excellent characteristics without reductions in heat resistance and heat shrinkage characteristics of the separator. In an embodiment, the surface gloss value at 60° C. of the surface of the heat fusion layer may be 20 GU or more or 25 GU or more. In an embodiment, the surface gloss value at 60° C. of the surface of the heat fusion layer may be 30 GU or more or 45 GU or more.

Hereinafter, each component of the separator according to an embodiment of the present invention will be described.

According to an embodiment, the porous substrate may be formed of a polyolefin such as polyethylene or polypropylene, and may be a film or sheet formed of one or two or more resins selected from the group consisting of polyethylene and polypropylene. Such porous films are commercially available and have a porosity needed for allowing lithium ions passing through the film between the electrodes of the secondary lithium-ion battery.

The polyolefin-based porous substrate is commonly produced in a film shape and is not limited as long as it is generally used as a separator of an electrochemical device. Examples thereof include, but are not limited to, polyethylene, polypropylene, and a copolymer thereof.

A thickness of the porous substrate is not particularly limited, and may be, for example, 1 μm or more, 3 μm or more, 5 μm or more, 100 μm or less, 50 μm or less, 30 μm or less, 20 μm or less, or between the numerical values. As a non-limiting example, the thickness of the porous substrate may be 1 to 100 μm, for example 5 to 50 μm, and for example 5 to 30 μm. According to an example, the porous substrate may be a porous polymer substrate produced by stretching.

In an embodiment, the porous substrate may have a surface including a polar functional group. Non-limiting examples of the polar functional group include, but are not limited to, a carboxyl group, an aldehyde group, and a hydroxyl group. According to an embodiment, the polar functional group may be introduced by a hydrophilic surface treatment. The hydrophilic surface treatment may include one or more of a corona discharge treatment and a plasma discharge treatment. The polar functional group provided on the surface of the porous substrate may further improve an adhesive strength between the porous substrate and the inorganic particle layer by hydrogen bonding or chemical bonding to a polar functional group of a hydrolytic condensate of a silane compound as a binder described below, and may improve thermal stability by reducing a heat shrinkage rate at a high temperature.

In an embodiment, the inorganic particle layer may include inorganic particles and a hydrolytic condensate of a silane compound, and may be a porous inorganic particle layer in which pores are formed by connecting and fixing inorganic particles by the hydrolytic condensate of the silane compound. In an embodiment, the inorganic particle layer may be provided on at least one surface of the porous substrate, and may have an area fraction of 60% or more, 70% or more, 80% or more, or up to 90% or more based on an overall surface of the porous substrate, or the inorganic particle layer may be provided on the entire surface of the porous substrate.

In an embodiment, the inorganic particle layer may be coated on one surface, or, both surfaces of the porous substrate, and when the inorganic particle layer is coated on both surfaces of the porous substrate, a thickness of the inorganic particle layer coated on one surface and a thickness of the inorganic particle layer coated on the other surface may be the same as or different from each other. Although not particularly limited, in an embodiment, the thickness of the inorganic particle layer coated on one surface may be more than 0 μm, 0.3 μm or more, 0.5 μm or more, 3 μm or less, 2.5 μm or less, 2 μm or less, 1.5 μm or less, 1 μm or less, or between the numerical values. In a specific embodiment, the thickness of the inorganic particle layer may be more than 0 μm and 2.5 μm, more than 0.5 μm and 2.5 μm or less, or more than 0.5 μm and 2 μm or less. In an embodiment, the thickness of the inorganic particle layer may be more than 0 μm and 1.5 μm or less. In an embodiment, the thickness of the inorganic particle layer may be more than 0.5 μm. In an embodiment, the thickness of the inorganic particle layer may be more than 0.5 μm and 1 μm or less.

embodiment Suitable inorganic particles may include one or two or more of a metal hydroxide, a metal oxide, a metal nitride, and a metal carbide, or may include one or two or more of $SiO_2$, SiC, MgO, $Y_2O_3$, $Al_2O_3$, $CeO_2$, CaO, ZnO, $SrTiO_3$, $ZrO_2$, $TiO_2$, and AlO(OH). In particular, for improved battery stability, the inorganic particles may be metal hydroxide particles such as, for example, boehmite (aluminum oxyhydroxide AlO(OH)).

In some embodiments, the metal hydroxide may include one or two or more of boehmite, aluminum hydroxide, and magnesium hydroxide. In a particular, when boehmite is used, a specific surface area (BET) of the inorganic particles may be 10 $m^2$/g or more or 15 $m^2$/g or more, up to 50 $m^2$/g, or the values between the numericals, but is not limited thereto.

For example, the inorganic particles may be boehmite, and in this case, a specific surface area (BET) of the boehmite may be 10 $m^2$/g or more, and specifically, the specific surface area of the boehmite may be 15 $m^2$/g or more.

An average particle diameter (D50) of the inorganic particles may be 0.01 μm or more, 0.05 μm or more, 0.1 μm or more, 5 μm or less, 1 μm or less, 0.5 μm or less, or between the numerical values. As a non-limiting example, the average particle diameter (D50) of the inorganic particles may be 0.01 to 5 μm, for example 0.01 to 1 μm, and for example 0.01 to 0.5 μm.

In an embodiment, the binder may be a condensate having a significantly low molecular weight obtained by hydrolyzing and condensing a silane compound represented by the following Chemical Formula 1 and having a polar group under a specific condition in which condensation of the silane compound is suppressed.

   [Chemical Formula 1]

In Chemical Formula 1, A is hydrogen, a polar functional group, or a C1-C10 alkyl group having a polar functional group, R is independently hydrogen or a C1-C5 alkyl group, a is 0 to 2, b is 2 to 4, and a+b is 4. In an embodiment, a low molecular weight condensate obtained by condensation using the silane compound of Chemical Formula 1 in which b is 3 in terms of adhesive strength and the like may be used.

In an embodiment, the polar functional group of the silane compound may include one or two or more selected from an amino group, an epoxy group, a carboxyl group, a hydroxyl group, an amide group, a thiol group, a ketone group, an ester group, and an aldehyde group, or may be a reactive group that reacts with these groups. According to an embodiment, the polar functional group may be an amino group.

As a non-limiting example, the silane compound satisfying Chemical Formula 1 may be one or a mixture of two or more selected from (3-aminopropyl)triethoxysilane, (3-aminopropyl)trimethoxysilane, and (3-glycidyloxypropyl)trimethoxysilane, but is not limited thereto.

In an embodiment, the hydrolytic condensate of the silane compound has a low molecular weight because it is condensed under a condition in which the silane compound is hydrolyzed and is condensation-suppressed. In an embodiment, the hydrolytic condensate of the silane compound may be a hydrolytic condensate produced under a condition in which the silane compound is hydrolyzed and is condensation-suppressed in a weakly acidic atmosphere, and may be prepared with a significantly low molecular weight because a condensation reaction is suppressed in a weakly acidic atmosphere. In an embodiment, the hydrolytic condensate of the silane compound may be a low molecular weight hydrolytic condensate having a number average molecular weight of, for example, 4,000 g/mol or less, 2,000 g/mol or less, or 1,000 g/mol or less.

In general, when the silane compound of Chemical Formula 1 is condensed with a strong acid such as an inorganic acid, a polysiloxane condensate having a number average molecular weight in the thousands of more than 4,000 g/mol is produced. On the other hand, the hydrolytic condensate of the silane compound according to an embodiment of the present invention produced under the condition in which condensation is suppressed differs from the general case in that it is a hydrolytic condensate including a hydrolysate itself, an unreacted product in a form of a monomer, and a dimer hydrolytic condensate as main components, and a trace amount of a trimer hydrolytic condensate or a tetramer hydrolytic condensate.

That is, in an embodiment, the hydrolytic condensate of the silane compound may include one or two or more selected from a hydrolysate, a monomer, and a multimer, such as a hydrolyzed and condensed dimer, trimer, tetramer, or pentamer, of the silane compound.

The low molecular weight hydrolytic condensate of the silane compound as described above may be confirmed from a detection peak detected in positive ESI-MS (electrospray ionization-mass spectrometry) analysis using positive electrospray ionization Fourier transform ion cyclotron resonance mass spectroscopy (posESI FT-ICRMS) (manufacturer: Bruker Corporation, model name: Solarix 2XR). That is, as a result of the positive ESI-MS analysis, peaks of silanol, which is a hydrolysate, and a dimer, which is a condensate, are mainly observed, and peaks of trace amounts of a trimer and a tetramer are observed, and peaks of a pentamer or higher multimer are hardly detected within one day or two days, which is a period for preparing a general slurry. However, in a case where a silane compound is hydrolyzed and condensed using hydrochloric acid, which is an inorganic acid, for 24 hours, although not additionally attached, complex peaks of high molecular weight hydrolytic condensates are observed. From these results, it may be confirmed that the hydrolytic condensate of the silane compound prepared in a weakly acidic atmosphere of the embodiment and a material different from the hydrolytic condensate produced with a general inorganic acid or the like are obtained.

The hydrolytic condensate of the silane compound according to an embodiment is prepared as a relatively low molecular weight hydrolytic condensate under a condition in which a condensation reaction of a silane compound including a polar functional group is relatively suppressed compared to a hydrolysis reaction, and as a result, it is possible to secure a large fraction of the polar group at the same weight compared to a high molecular weight polysiloxane condensate generally prepared by condensation with an inorganic acid or the like. Surprisingly, the hydrolytic condensate of the silane compound may further improve the adhesive strength between the inorganic particles, and may impart remarkable heat resistance.

In an embodiment, the hydrolytic condensate of the silane compound may be obtained by stirring in a weakly acidic atmosphere of more than pH 4 and pH 7 or less, and according to a non-limiting example, in particular, the hydrolytic condensate of the silane compound may be produced by adding one or two or more of carbon dioxide, acetic acid, and lactic acid to an aqueous solution to prepare an acid aqueous solution within the above range, and the addition method may be mixing an acid solution in a liquid phase or blowing or bubbling an acid gas.

In addition, in an embodiment, when a polar functional group is introduced into the surface of the porous substrate, the polar functional group provided on the surface of the porous substrate is hydrogen-bonded or chemically bonded to the polar functional group of the hydrolytic condensate of the silane compound as a binder to further improve the adhesive strength between the porous substrate and the inorganic particle layer, and may further reduce the heat shrinkage rate at a high temperature to improve thermal stability.

Next, the heat fusion layer will be described.

The heat fusion layer is not particularly limited as long as the surface gloss described above is satisfied, and in an embodiment, the heat fusion layer may include an acrylic particulate binder having a Tg of 30° C. or higher, 35° C. or higher, 40° C. or higher, 70° C. or lower, or between the numerical values in consideration of a process of manufacturing a separator and a process of manufacturing an electrochemical device. In an embodiment, the Tg may be 30 to 70° C. or 40 to 70° C.

In an embodiment, a Tm of the acrylic particulate binder may not appear. In another embodiment, when a Tm of the acrylic particulate binder appears, as a non-limiting example, the Tm may be 80° C. or higher, 85° C. or higher, 90° C. or higher, 100° C. or lower, or between the numerical values, in consideration of the temperature during fusion, but is not particularly limited. In an embodiment, the Tm may be 80 to 100° C. or 90 to 100° C.

In an embodiment, an average particle diameter of the acrylic particulate binder may be more than 0 μm, 0.01 μm or more, 0.05 μm or more, 0.1 μm or more, 0.2 μm or more, 0.3 μm or more, 0.4 μm or more, 1 μm or less, 0.8 μm or less, 0.6 μm or less, or between the numerical values. In an embodiment, the average particle diameter of the acrylic particulate binder may be 1 μm or less or 0.01 to 1 μm. In an embodiment, the average particle diameter of the acrylic particulate binder may be larger than an average particle diameter of the inorganic particles in the inorganic particle layer, and in this case, since a particle diameter of the acrylic particulate binder in the heat fusion layer is larger than a particle diameter of the inorganic particle, pores in the inorganic particle layer are not relatively blocked, and the air permeability may be improved.

In an embodiment, a thickness of the heat fusion layer may be 1 μm or less, 0.8 μm or less, 0.7 μm or less, more than 0 μm, 0.01 μm or more, 0.05 μm or more, 0.1 μm or more, 0.2 μm or more, 0.3 μm or more, 0.4 μm or more, or between the numerical values. In an embodiment, the thickness of the heat fusion layer may be 1 μm or less, 0.1 to 1 μm, for example 0.2 to 0.8 μm, and for example 0.3 to 0.7 μm.

According to an embodiment, as the thickness of the heat fusion layer formed by the acrylic particulate binder is significantly uniform and the heat fusion layer is coated on the surface of the inorganic particle layer filled with the inorganic particles at a high density, a contact area of the heat fusion layer with the inorganic particle layer is significantly increased, such that a sufficient adhesive strength is secured and the thermal stability is not reduced.

Next, an embodiment of a method of manufacturing the separator will be described.

According to an embodiment of the present invention, a method of manufacturing a separator may include: (a) adding inorganic particles and an acid component to an aqueous solution of a silane compound represented by the following Chemical Formula 1 and performing stirring and bubbling to prepare a slurry; (b) applying the prepared slurry on at least one surface of a porous substrate to form an inorganic particle layer; and (c) forming a heat fusion layer on at least one surface of the formed inorganic particle layer:

  [Chemical Formula 1]

wherein A is hydrogen, a polar functional group, or a C1-C10 alkyl group having a polar functional group, R is independently hydrogen or a C1-C5 alkyl group, a is 0 to 2, b is 2 to 4, and a+b is 4.

The polar functional group of the silane compound may include one or two or more selected from an amino group, an epoxy group, a carboxyl group, a hydroxyl group, an amide group, a thiol group, a ketone group, an ester group, and an aldehyde group.

Descriptions of the silane compound, the inorganic particles, and the porous substrate are the same as those described above, and thus are omitted for convenience.

According to an embodiment of the present invention, in the process (a), the silane compound is prepared as a hydrolytic condensate of the silane compound under a condition in which a condensation reaction is relatively suppressed compared to a hydrolysis reaction. As a result, the hydrolytic condensate of the silane compound may be a significantly low molecular weight condensate including a monomer, a hydrolysate, and a dimer as main components, and including a trace amount of a trimer or tetramer, the condensate being obtained under a condition in which condensation is suppressed, which is different from a polysiloxane condensate having a number average molecular weight of more than 4,000 g/mol, the polysiloxane condensate being condensed with a strong acid such as a general inorganic acid.

In an embodiment, as a method of relatively suppressing a condensation reaction compared to a hydrolysis reaction, the process (a) of preparing the slurry may be performed in a weakly acidic atmosphere, and in an embodiment, the weakly acidic atmosphere may be more than pH 4 and pH 7 or less. When the hydrolysis and condensation reaction is performed in a case of pH 4 or less, in a case of a basic atmosphere (more than pH 7), or in a case of using an inorganic acid such as sulfuric acid or hydrochloric acid, the dispersibility of the prepared slurry may be reduced, and when the inorganic particle layer is filled with the inorganic particles, an issue may occur due to aggregation of the binder. In addition, the thickness of the inorganic particle layer is significantly non-uniform, and as a result, the surface gloss of the heat fusion layer desired in the present invention may not be achieved. In the above case, the heat resistance or the adhesive strength of the separator may be reduced. In consideration of this, the weakly acidic atmosphere may be more than pH 4, pH 4.5 or more, pH 5 or more, pH 5.5 or more, pH 6 or more, pH 6.5 or more, pH 7 or less, or between the numerical values. In an embodiment, the weakly acidic atmosphere may be more than pH 4 and pH 7 or less or pH 4.5 or more and pH 7 or less.

In addition, in the process (a) of preparing the slurry, a method or order of adding the components constituting the slurry is not particularly limited, and all possible methods may be used. For example, in an embodiment, an acid aqueous solution including a silane compound represented by Chemical Formula 1 and an acid component is separately prepared, an inorganic slurry is separately prepared by stirring inorganic particles, an acid component, and water, and then the separately prepared acid aqueous solution and inorganic slurry are stirred, thereby preparing a slurry.

According to an embodiment, the acid component in the process (a) may be carbon dioxide, or an organic acid including one or two selected from acetic acid and lactic acid. Carbon dioxide may become carbonic acid when added to the aqueous solution of the silane compound and then stirred or bubbled. When the acid component is used, the effect of the present invention may be better achieved, and the condensation reaction may be easily suppressed in the above pH range, but the present invention is not limited thereto, as long as the separator having physical properties of the present invention is provided.

According to an embodiment, the inorganic particles and the silane compound of Chemical Formula 1 may be included in the slurry in the process (a) at a weight ratio of 70 to 99.9:30 to 0.1, 80 to 99.9:20 to 0.1, or 90 to 99.9:10 to 0.1, but are not particularly limited.

As a method of preparing the slurry, all common methods known in the art may be applied without limitation, and although not particularly limited, according to a non-limiting example, a slurry may be prepared by dispersing inorganic particles at 0 to 60° C. for 1 hour to 5 days, and aggregated inorganic particles may be dispersed using a ball mill.

According to an embodiment of the present invention, in the process (b), an inorganic particle layer may be provided on at least one surface of the porous substrate. As a method of applying the slurry, all common methods known in the art may be applied without limitation. Drying to form the inorganic particle layer is not particularly limited, and may be performed at 100° C. or lower or 30 to 60° C.

According to an embodiment, the process (b) may include applying the slurry prepared in the process (a) on the porous substrate and then allowing the slurry to stand at room temperature for 5 minutes or longer. The standing time of 5 minutes or longer may be desirable because it may give a time to rearrange the inorganic particles and the hydrolytic condensate of the silane compound as a binder in the slurry and to induce the inorganic particle layer to be filled with the inorganic particles at a high density. From this point of view, in an embodiment, the standing time may be 10 minutes or longer or 15 minutes or longer. The process of applying the slurry on the porous substrate and then allowing the slurry to stand at room temperature for 5 minutes or longer is in contrast to a process of applying the slurry on the porous substrate and then immediately transferring the porous substrate on which the slurry is applied to a dryer within 1 minute for drying, and imparts a more excellent effect to the separator in terms of physical properties such as the surface gloss, the thermal stability, the adhesive strength to an electrode, and the electrical characteristics.

In an embodiment, when a polar functional group is introduced into the surface of the porous substrate, the polar functional group provided on the surface of the porous substrate is hydrogen-bonded or chemically bonded to the polar functional group of the hydrolytic condensate of the silane compound as a binder to further improve the adhesive strength between the porous substrate and the inorganic particle layer, and may further reduce the heat shrinkage rate at a high temperature to improve thermal stability. Examples of a method of introducing a polar functional group into the surface of the porous substrate include a hydrophilic surface treatment, and according to an example, the hydrophilic surface treatment may include one or more of a corona discharge treatment and a plasma discharge treatment in an air, oxygen, or ozone atmosphere. Examples of the polar functional group introduced into the surface of the porous substrate include, but are not particularly limited to, a carboxyl group, an aldehyde group, and a hydroxyl group.

In an embodiment, the method of manufacturing a separator may further include, after the drying, aging the porous substrate on which the inorganic particle layer is provided. Specifically, the aging may be performed at 50 to 150° C., and may be performed at 65 to 120° C., and the aging may be performed for 2 hours to 24 hours, and may be performed for to 20 hours. In an embodiment, the aging may be performed in a temperature range of 70 to 120° C. for 10 to 15 hours. Through the aging, the adhesive strength between the porous substrate and the inorganic particle layer may be increased, and the high-temperature shrinkage characteristics may be improved.

That is, as the method of manufacturing a separator according to an embodiment of the present invention further includes the aging process, high-temperature shrinkage characteristics may be further improved through a stable and strong chemical bonding between the porous substrate and the inorganic particle layer, such that a method of manufacturing a separator having further improved thermal stability may be provided, and the adhesive strength between the porous substrate and the inorganic particle layer may be further improved.

According to an embodiment of the present invention, in the process (c), a heat fusion layer may be provided on at least one surface of the inorganic particle layer. In an embodiment, the heat fusion layer may be provided by preparing a uniform slurry obtained by adding the acrylic particulate binder as a main component to water as a solvent and then performing stirring, applying the slurry on at least one surface of the inorganic particle layer, and then drying the slurry.

As a method of applying the slurry, all common methods known in the art may be applied without limitation. The drying to form the heat fusion layer is not particularly limited, and may be performed at lower than 80° C. or 30 to 70° C.

A description of the acrylic particulate binder is the same as that described above, and thus is omitted for convenience.

According to an embodiment of the present invention, it is possible to provide an electrochemical device including the separator as described above. The electrochemical device may be any known energy storage device, but is not particularly limited. As a non-limiting example, the electrochemical device may be a lithium secondary battery. Since the lithium secondary battery is well known and a configuration thereof is also known, the lithium secondary battery is not described in detail in the present invention.

The lithium secondary battery according to an embodiment of the present invention may include the separator described above between a positive electrode and a negative electrode. In this case, any positive electrode and negative electrode may be used without limitation as long as they are generally used in a lithium secondary battery.

Hereinafter, the present invention will be described in more detail with reference to Examples and Comparative Examples. However, the following Examples and Comparative Examples are only examples for describing the present invention in more detail, and the present invention is not limited by the following Examples and Comparative Examples.

First, the methods for measuring the physical properties of the separator will be described.

[Average Thicknesses of Inorganic Particle Layer and Heat Fusion Layer]

Average thickness of inorganic particle layer: A separator including an inorganic particle layer and a porous substrate, in which only the inorganic particle layer was formed on both surfaces of the porous substrate, was overlapped in 10 layers, each thickness was measured at 5 random points in a transverse direction (TD) with a thickness meter available from Mitutoyo Corporation, an average thickness of the 10-layer separator was derived by dividing the measured thicknesses by 5, and then an average thickness of a single separator was determined by dividing the average thickness by 10. An average thickness of the inorganic particle layer was determined by subtracting an average thickness of the porous substrate from the average thickness of the single separator and then dividing by 2. When the inorganic particle layer was provided on at least one surface of the porous substrate, the inorganic particle layer was released using all methods known in the art without limitation and sufficiently dried, and an average thickness of the porous substrate from which the inorganic particle layer was released was determined.

Average thickness of heat fusion layer: A separator including a heat fusion layer, an inorganic particle layer, and a porous substrate, in which the inorganic particle layer and the heat fusion layer were sequentially formed on both surfaces of the porous substrate, was overlapped in 10 layers, each thickness was measured at 5 random points in TD with a thickness meter available from Mitutoyo Corporation, an average thickness of the 10-layer separator was derived by dividing the measured thicknesses by 5, and then an average thickness of a single separator was determined by dividing the average thickness by 10. An average thickness of the heat fusion layer was determined by subtracting the sum of a thickness of the porous substrate and an average thickness of two inorganic particle layers formed on both surfaces of the porous substrate from the average thickness of the single separator and then dividing by 2.

[Surface Gloss]

A surface gloss of the separator at 60° C. of the surface of the heat fusion layer was measured. The surface gloss was measured at 7 random points on the surface of the heat fusion layer of the separator with a surface gloss measuring equipment (Konica Minolta, Inc., Spectrophotometer CM-36dG), and then an average value of the measured surface glosses was derived.

[Amount of Change in Air Permeability]

An amount of change in air permeability ($\Delta G$) was calculated as follows.

$$\Delta G = G_1 - G_2$$

In Equation 1, $G_1$ was Gurley permeability of a separator including an inorganic particle layer and a heat fusion layer, $G_2$ was Gurley permeability of a porous substrate itself without an inorganic particle layer and a heat fusion layer, and a unit of the Gurley permeability measured according to ASTM D 726 was sec/100 cc.

The Gurley permeability was measured according to the standard of ASTM D 726 using a densometer available from Toyo Seiki Seisaku-sho, Ltd. A time required for 100 cc of air to pass through an area of 1 square inch of the separator was recorded in seconds.

[Adhesive Strength to Electrode]

In order to evaluate an adhesive strength to an electrode, the separator was heat-fused on a carbon sheet instead of the electrode, and then a peel strength was measured and evaluated by the following method.

The separator was stacked on a carbon sheet (TOYO TANSO KOREA CO., LTD., PF-20HP) having a thickness of 200 μm so that the heat fusion layer of the separator faced the carbon sheet, the separator and the heat fusion layer were compressed and fused at 80° C. and 1 MPa for 30 seconds with a heat press machine, and then the separator was peeled at 180° using a universal testing machine (UTM) available from Instron Corporation.

[Electrolyte Solution Impregnability]

A drop of 10 μl of an electrolyte solution obtained by dissolving 1 M lithium hexafluorophosphate ($LiPF_6$) in a solution in which ethylene carbonate (EC), ethylmethyl carbonate (EMC), and dimethyl carbonate (DMC) were included at a volume ratio of 30:50:20 was dropped on the separator from a height of 50 mm with a micropipette and then allowed to stand for 1 minute. Thereafter, the major diameter of the mark where the electrolyte solution was spread was observed, and it was evaluated as excellent (⊚) when the major diameter was 25 mm or more, as good (◯) when the major diameter was 15 to 25 mm, and as poor (△) when the major diameter was less than 15 mm. The major diameter means the longest length among the lengths crossing the electrolyte solution mark.

[Heat Shrinkage Rate]

A heat shrinkage rate of the separator was measured based on ASTM D 1204 by the following method. Grid points were marked at intervals of 2 cm on a square with one side of 10 cm on the separator. One side of the square was in a transverse direction (TD), and the other side of the square was in a machine direction (MD). A specimen was placed in the central portion, five sheets of paper were placed on each of the top and bottom of the specimen, and four sides of the paper were wrapped with a tape. The specimen wrapped with the paper was allowed to stand in a hot air drying oven at 150° C. for 60 minutes.

Thereafter, the specimen was taken out, the separator was observed with a camera, and a shrinkage rate in a length direction of the following Equation 1 and a shrinkage rate in a width direction of the following Equation 2 were calculated.

Shrinkage rate (%) in length direction=(Length in length direction before heating−Length in length direction after heating)×100/Length in length direction before heating     Equation 1

Shrinkage rate (%) in width direction=(Length in width direction before heating−Length in width direction after heating)×100/Length in width direction before heating     Equation 2

[TMA Melt Fracture Temperature]

When specimens each having a thickness of 5 to 50 μm, a width of 5 mm, and a length of 10 mm in each of MD and TD serving as length directions were prepared from the separator, and the specimen was mounted on a chamber of a thermomechanical analyzer (TMA) (model: SDTA840 (Mettler Toledo)) by hooking both ends of the specimen to a metal jig and pulled downward with a force of 0.008 N while heating at 5° C. per minute, a temperature at which the specimen was broken in each of MD and TD was derived.

[Battery Resistance]

A battery was manufactured under the following conditions, and a discharge resistance was measured by J-pulse method.

Manufacture of Battery

Based on the total weight, 94 wt % of $LiCoO_2$ as a positive electrode active material, 2.5 wt % of polyvinylidene fluoride as a fusion adhesive, and 3.5 wt % of carbon black as a conductive agent were added to N-methyl-2-pyrrolidone (NMP) as a solvent, and stirring was performed to prepare a uniform positive electrode slurry. The prepared positive electrode slurry was coated, dried, and compressed on an aluminum foil having a thickness of 30 μm to prepare a positive electrode having a total thickness of 150 μm. Based on the total weight, 95 wt % of artificial graphite as a negative electrode active material, 3 wt % of acrylic latex having a Tg of −52° C. as a fusion adhesive, and 2 wt % of carboxymethyl cellulose (CMC) as a thickener were added to water as a solvent, and stirring was performed to prepare a uniform negative electrode slurry. The prepared negative electrode slurry was coated, dried, and compressed on an aluminum foil having a thickness of 20 μm to prepare a negative electrode having a total thickness of 150 μm. The prepared positive electrode, negative electrode, and separator of each of Examples and Comparative Examples were assembled into a pouch-type battery by stacking the positive electrode, negative electrode, and separator so that the separator was interposed between the positive electrode and the negative electrode, and then the assembled battery was heat-fused at 80° C. and 1 MPa with a heat press machine in order to fuse the positive electrode, the negative electrode, and the separator to each other. Thereafter, an electrolyte solution in which 1 M lithium hexafluorophosphate ($LiPF_6$) was dissolved was injected into a solution including ethylene carbonate (EC), ethylmethyl carbonate (EMC), and dimethyl carbonate (DMC) at a volume ratio of 30:50:20, and then the battery was sealed, thereby manufacturing a secondary battery having a capacity of 2 Ah.

Example 1

Slurry

To 100 parts by weight of distilled water, 3.1 parts by weight of (3-aminopropyl)silanetriol as a silane compound was added, and 29 parts by weight of boehmite having an average particle size (D50) of 0.24 μm as inorganic particles was added while $CO_2$ bubbling was performed using dry ice. A slurry was prepared by performing stirring with a ball mill and bubbling for 48 hours while maintaining the internal pH at 4 to 5 during the $CO_2$ bubbling.

Porous Substrate

A polyethylene porous film (porosity: 41%, Gurley permeability: 121 sec/100 cc, tensile strength MD: 2,807 kgf/$cm^2$/TD: 2,515 kgf/$cm^2$) having a thickness of 10 μm was used as a porous substrate, both surfaces of the polyethylene porous film were subjected to a corona discharge treatment (power density: 2 W/mm) to introduce a surface polar group, and at this time, the corona surface treatment was performed at a rate of 3 to 20 mpm (meter per minute).

Inorganic Particle Layer

The prepared slurry was applied on both surfaces of the porous substrate and then allowed to stand at room temperature for 5 minutes. Thereafter, the porous substrate on which the slurry was applied was sufficiently dried in a dryer at 50° C. to form inorganic particle layers each having an average thickness of 1.5 μm. The porous substrate on which the inorganic particle layer was formed was subjected to aging at 80° C. for 12 hours.

Heat Fusion Layer

A uniform slurry was prepared by adding an acrylic particulate binder (a particulate binder obtained by polymerizing methyl methacrylate and butyl acrylate) having a Tg of 60° C. and an average particle diameter (D50) of 0.45 μm as a main component to water as a solvent and performing stirring, the slurry was applied on each of the aged inorganic particle layers, and the slurry was dried to form a heat fusion layer having an average thickness of 0.5 μm, thereby manufacturing a separator. A surface gloss value at 60° of a surface of the heat fusion layer of the manufactured separator was 42 GU.

Example 2

A separator was manufactured under the same conditions as in Example 1, except that, in the preparation of the slurry, boehmite having an average particle of 0.31 μm was used as inorganic particles, and in the formation of the heat fusion layer, acrylic particulate binder particles having a Tg of 60° C. and an average particle diameter (D50) of 0.7 μm were applied on the inorganic particle layer and drying was performed to form a heat fusion layer having an average thickness of 0.8 μm. A surface gloss value at 60° of a surface of the heat fusion layer of the manufactured separator was 31 GU.

Example 3

A separator was manufactured under the same conditions as in Example 1, except that in the formation of the inorganic particle layer, the prepared slurry was applied on the porous substrate, and then the porous substrate on which the slurry was applied was immediately transferred to a dryer for drying within 15 seconds without additional standing. A surface gloss value at 60° of a surface of the heat fusion layer of the manufactured separator was 11 GU.

Comparative Example 1

A separator including inorganic particle layers each having a thickness of 1.8 μm was manufactured under the same conditions as in Example 1, except that, in the preparation of the slurry, a slurry was prepared by mixing 0.5 parts by weight of polyvinyl alcohol (PVA) having a melting temperature of 220° C. and a saponification degree of 99% and 2.5 parts by weight of acrylic latex (ZEON, BM900B, solid content 20 wt %) having a Tg of −52° C. with 100 parts by weight of distilled water, and adding parts by weight of boehmite having an average particle diameter (D50) of 0.3 μm as inorganic particles. A surface gloss value at 60° of a surface of the heat fusion layer of the manufactured separator was 4 GU.

Comparative Example 2

A separator was manufactured under the same conditions as in Example 1, except that, in the preparation of the slurry, hydrochloric acid was used as an acid component, and hydrolysis and condensation were performed at pH 3.5. A surface gloss value at 60° of a surface of the heat fusion layer of the manufactured separator was 1 GU.

Comparative Example 3

A separator was manufactured under the same conditions as in Example 1, except that in the preparation of the slurry, an acid component was not added and a slurry of pH 8.2 was prepared. A surface gloss value at 60° of a surface of the heat fusion layer of the manufactured separator was 1 GU.

EVALUATION EXAMPLES

Evaluation of Separator

The results of the physical properties of Examples and Comparative Examples of the present invention are shown in Table 1.

TABLE 1

| | Amount of change in air permeability ΔG | Adhesive force to electrode | Electrolyte solution impregnability | Heat shrinkage rate (%) | | TMA melt fracture temperature (° C.) | | Battery resistance |
|---|---|---|---|---|---|---|---|---|
| | (sec/100 cc) | (gf) | | MD | TD | MD | TD | (mΩ) |
| Example 1 | 29 | 15 | ◎ | 1.8 | 1.6 | 235 | 227 | 22.7 |
| Example 2 | 36 | 12 | ◎ | 2.1 | 1.7 | 240 | 210 | 23.4 |
| Example 3 | 45 | 7 | ◎ | 2.2 | 1.9 | 235 | 200 | 24.8 |
| Comparative Example 1 | 53 | 5 | ○ | 51 | 48 | 160 | 150 | 30.8 |
| Comparative Example 2 | 72 | 3 | ○ | 41 | 38 | 157 | 148 | 28.5 |
| Comparative Example 3 | 80 | 3 | ○ | 44 | 37 | 155 | 150 | 27.4 |

* ◎: Excellent, ○: Good, Δ: Poor

Referring to Table 1, in Examples of the present invention, compared to Comparative Examples, the amount of change in air permeability was low, the adhesive strength to the electrode was excellent, the electrolyte solution impregnability was excellent, and at the same time, in particular, the thermal stability such as the heat shrinkage rate or the TMA melt fracture temperature was excellent. In addition, in the secondary battery manufactured using the separator of each of Examples, the battery resistance was low compared to the battery manufactured using an organic polymer binder of Comparative Example 1, and thus the charging and discharging efficiency of the battery was excellent, and the high output was realized. Meanwhile, the separators of Comparative Examples not belonging to the present invention did not satisfy these physical properties, and in particular, in Comparative Examples 2 and 3, as the pH was too low or too high, aggregation of the binder occurred, a proper separator was not obtained by gelation of the slurry, and because of this, the air permeability, the adhesive strength to the electrode, the electrolyte solution impregnability, the heat shrinkage rate, the battery resistance, and the like were inferior to those in the Examples.

In Examples 1 to 3, the amount of change in air permeability was 60 sec/100 cc or less, which was relatively low, and thus, it could be appreciated that when the hydrolytic condensate of the silane compound according to the present invention was used as a binder, an inorganic particle layer having a porous structure having excellent air permeability compared to Comparative Example 1 using an organic polymer was formed. In the case of the separator according to an embodiment of the present invention, the amount of change in air permeability was relatively low and the ion conductivity was relatively excellent. Therefore, an electrochemical device including the separator is expected to be more advantageous in output and life characteristics.

In addition, referring to the results of measuring the adhesive strength to the electrode, the adhesive strength of the separator of each of Examples 1 to 3 was improved compared to the separator of Comparative Example 1 using an organic polymer.

In addition, in the cases of the separators of Examples 1 to 3, when the separator was pulled while heating the separator at the TMA melt fracture temperature measured with TMA, the separator was melted and broken by heat at a temperature of 180° C. or higher, and considering that the melting temperature of polyethylene used as the porous substrate of the separator was around 140° C., it could be appreciated that the heat shrinkage rate was significantly excellent. On the other hand, it could be appreciated that the separator of Comparative Example 1 was relatively inferior to those of Examples because it was melted and broken by heat at a temperature of lower than 180° C.

Meanwhile, in the case of the separator of Example 2, the surface gloss was lower than that in Example 1, and thus, the adhesive strength to the electrode, the electrolyte solution impregnability, the heat shrinkage rate, the battery resistance, and the like were relatively inferior to those in Example 1, but sufficient physical properties were secured.

In the case of the separator of Example 3, as a result of not setting additional standing time after applying the slurry, the time required to rearrange the inorganic particles and the hydrolytic condensate of the silane compound as a binder and to induce the inorganic particle layer to be filled with the inorganic particles at a high density was short, and thus, the air permeability, the adhesive strength to the electrode, the electrolyte solution impregnability, the heat shrinkage rate, the battery resistance, and the like were relatively inferior to those of the separators of Examples 1 and 2, but sufficient physical properties were secured.

As set forth above, according to an embodiment, in the secondary battery separator in which the inorganic particle layer in which pores are formed by connection of inorganic particles to each other is provided on at least one surface of the porous substrate, the hydrolytic condensate of the silane compound produced under a specific condition in which a silanol or alkoxysilane-based compound is hydrolyzed and is condensation-suppressed is used as a binder, such that the thermal stability of the separator may be significantly improved.

According to an embodiment, when the hydrolytic condensate of the silane compound produced under a condition in which condensation of the silane compound is suppressed is used as a binder that connects and fixes the inorganic particles, the thickness of the inorganic particle layer is significantly thin and significantly uniform, and therefore, when the heat fusion layer is formed on the inorganic particle layer, the gloss may be increased, the heat shrinkage rate at a high temperature may be significantly reduced, and the thermal stability may be significantly improved. That is, as the thickness of the inorganic particle layer is significantly uniform and the inorganic particle layer is filled with the inorganic particles at a high density, the heat shrinkage rate is significantly increased, and when the heat fusion layer is formed on the inorganic particle layer, the surface gloss is increased. Therefore, the thermal stability and the adhesive strength to the electrode of the separator may be simultaneously improved, and the electrical characteristics of the electrochemical device including the separator may also be improved. In an embodiment, the surface gloss value at 60° C. of the surface of the heat fusion layer may be a specific surface gloss of 10 GU or more. In addition, in an embodiment, the surface gloss value at 60° C. of the surface of the heat fusion layer may be 20 GU or more or 25 GU or more. In an embodiment, the surface gloss value at 60° C. of the surface of the heat fusion layer may be 30 GU or more, GU or more, or 45 GU or more.

In an embodiment, the separator may have more excellent thermal stability so that when specimens each having a thickness of 5 to 50 μm, a width of 5 mm, and a length of 10 mm in each of MD and TD serving as length directions are prepared from the separator, and the specimen is mounted on a chamber of a thermomechanical analyzer (TMA) (model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, 210° C. or higher, or 220° C. or higher in both MD and TD.

In an embodiment, a heat shrinkage rate in each of MD and TD may be 3% or less, 2.5% or less, or 2% or less when measured after the separator is allowed to stand at 150° C. for 60 minutes.

At the same time, the separator of an embodiment may have an excellent adhesive strength to an electrode of more than gf or 10 gf or more when measured by stacking the separator on a carbon sheet (TOYO TANSO KOREA CO., LTD., PF-20HP) having a thickness of 200 μm, which is used instead of an electrode, so that the heat fusion layer of the separator faces the carbon sheet, compressing and fusing the carbon sheet and the separator at 80° C. and 1 MPa for 30 seconds with a heat press machine, and then peeling the separator at 180° using a universal testing machine (UTM) available from Instron Corporation.

Further, the separator according to an embodiment may have improved air permeability so that the amount of change in air permeability is 60 sec/100 cc or less or 50 sec/100 cc or less compared to a separator without the inorganic particle layer and the heat fusion layer.

In an embodiment for providing the above physical properties, it is possible to provide a separator including: a porous substrate; an inorganic particle layer provided on at least one surface of the porous substrate; and a heat fusion layer provided on at least one surface of the inorganic particle layer, wherein the inorganic particle layer includes inorganic particles and a hydrolytic condensate of a silane compound, and a surface gloss value at 60° C. of a surface of the heat fusion layer is 10 GU or more. In an embodiment, the surface gloss value at 60° C. of the surface of the heat fusion layer may be 20 GU or more or 25 GU or more. In an embodiment, the surface gloss value at 60° C. of the surface of the heat fusion layer may be 30 GU or more, 40 GU or more, or 45 GU or more.

Further, in an embodiment, when the porous substrate is modified to include a polar functional group such as a carboxyl group, an aldehyde group, or a hydroxyl group by a surface treatment including one or more of a corona discharge treatment and a plasma discharge treatment, a polar functional group of the hydrolytic condensate of the silane compound that fixes the inorganic particle layer as a binder may be hydrogen-bonded or chemically bonded to the polar functional group on the surface of the porous substrate, such that the adhesive strength between the porous substrate and the inorganic particle layer is significantly improved without using an organic polymer binder according to the related art, and the high-temperature shrinkage rate even at a high temperature is also significantly reduced, thereby providing the effect of significantly improving thermal stability.

Further, in an embodiment, the inorganic particle layer is formed, and then an aging process is performed, such that the adhesive strength between the porous substrate and the inorganic particle layer may be increased, and the high-temperature shrinkage characteristics may be further improved.

In an embodiment, it is possible to provide a novel separator satisfying all of the above physical properties.

Hereinabove, although the present invention has been described by specific features, limited embodiments, and drawings, they have been provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to the above described embodiments. Furthermore, the following claims and all modifications equal or equivalent to the claims are intended to fall within the spirit of the present invention. The embodiments may be combined to form additional embodiments.

What is claimed is:

1. A method of manufacturing a separator, the method comprising:
    (a) adding inorganic particles and an acid component to an aqueous solution of a silane compound represented by the following Chemical Formula 1 and stirring while injecting $CO_2$ to prepare a slurry;
    (b) applying the slurry on at least one surface of a porous substrate to form an inorganic particle layer; and
    (c) forming a heat fusion layer on at least one surface of the inorganic particle layer,
    wherein a surface gloss value at 60° C. of a surface of the heat fusion layer is 10 GU or more:

$$A_a Si(OR)_b \qquad \text{[Chemical Formula 1]}$$

wherein A is hydrogen, a polar functional group, or a C1-C10 alkyl group having a polar functional group, R is independently hydrogen or a C1-C5 alkyl group, a is 0 to 2, b is 2 to 4, and a+b is 4.

2. The method of claim 1, wherein the process (b) includes applying the slurry on the porous substrate and then allowing the slurry to stand at room temperature for 5 minutes or longer.

3. The method of claim 1, wherein the heat fusion layer includes an acrylic particulate binder having a Tg of 30° C. to 70° C.

4. The method of claim 1, wherein the polar functional group of the silane compound includes one or two or more selected from an amino group, an epoxy group, a carboxyl group, a hydroxyl group, an amide group, a thiol group, a ketone group, an ester group, and an aldehyde group.

5. The method of claim 1, wherein the process (a) of preparing the slurry is performed in a weakly acidic atmosphere of more than pH 4 and pH 7 or less.

6. The method of claim 1, wherein the acid component is carbon dioxide, or an organic acid including one or two selected from acetic acid and lactic acid.

7. The method of claim 1, wherein the inorganic particles and the silane compound of Chemical Formula 1 are included in the slurry in the process (a) at a weight ratio of 70 to 99.9:30 to 0.1.

* * * * *